United States Patent
Ueki et al.

(10) Patent No.: US 9,309,644 B2
(45) Date of Patent: Apr. 12, 2016

(54) CONSTRUCTION MACHINE

(71) Applicant: Hitachi Construction Machinery Co., Ltd., Tokyo (JP)

(72) Inventors: Tsuyoshi Ueki, Ibaraki (JP); Kazuhiko Hiraoka, Tokyo (JP)

(73) Assignee: Hitachi Construction Machinery, Co. Ltd., Tokyo (JP)

( * ) Notice: Subject to any disclaimer, the term of this patent is extended or adjusted under 35 U.S.C. 154(b) by 14 days.

(21) Appl. No.: 14/403,654

(22) PCT Filed: Mar. 28, 2013

(86) PCT No.: PCT/JP2013/059361
§ 371 (c)(1),
(2) Date: Nov. 25, 2014

(87) PCT Pub. No.: WO2013/179755
PCT Pub. Date: Dec. 5, 2013

(65) Prior Publication Data
US 2015/0176247 A1 Jun. 25, 2015

(30) Foreign Application Priority Data
May 28, 2012 (JP) .................................. 2012-121052

(51) Int. Cl.
| | | |
|---|---|---|
| *B60N 99/00* | (2006.01) | |
| *E02F 9/16* | (2006.01) | |
| *E02F 9/08* | (2006.01) | |
| *E02F 9/26* | (2006.01) | |
| *B60R 3/00* | (2006.01) | |

(52) U.S. Cl.
CPC ... *E02F 9/16* (2013.01); *B60R 3/00* (2013.01); *E02F 9/0833* (2013.01); *E02F 9/0875* (2013.01); *E02F 9/26* (2013.01)

(58) Field of Classification Search
CPC ......... E02F 9/16; E02F 9/0833; E02F 9/0875; E02F 9/26; B60R 3/00
See application file for complete search history.

(56) References Cited

U.S. PATENT DOCUMENTS

2015/0176250 A1* 6/2015 Stutchbury ............. B60K 17/04
180/242

FOREIGN PATENT DOCUMENTS

| JP | 2002-206253 A | 7/2002 |
|---|---|---|
| JP | 2002-256593 A | 9/2002 |
| JP | 2007-46405 A | 2/2007 |
| JP | 2008-11253 A | 1/2008 |
| JP | 2008-95326 A | 4/2008 |
| JP | 2008-144573 A | 6/2008 |
| JP | 2010-106450 A | 5/2010 |

* cited by examiner

*Primary Examiner* — Lori L Lyjak
(74) *Attorney, Agent, or Firm* — Jones Robb, PLLC

(57) ABSTRACT

Provided is a construction machine that can realize the assurance of good vision for an operator sitting in a seat. In a wheeled excavator provided with a upperstructure (2), a seat disposed in a cab (7) mounted on the upperstructure (2), steps (11) arranged laterally to the cab (7) with the seat disposed therein and including a first step member (22), second step member (23) and third step member (24), and a compartment cover (13) arranged on a side opposite to the seat with respect to the steps (11), an arcuate upper indentation (13a) is formed in the compartment cover (13) at a part thereof that faces a space (25) defined between the third step member (24) and the second step member (23), and an arcuate lower indentation (13b) is formed in the compartment cover (13) at another part thereof that faces a space (26) defined between the second step member (23) and the first step member (22).

8 Claims, 4 Drawing Sheets

CONSTRUCTION MACHINE

TECHNICAL FIELD

This invention relates to a construction machine, such as a hydraulic excavator, which is provided with steps and a compartment cover laterally to a seat.

BACKGROUND ART

FIG. 4 is a side view showing a wheeled excavator as a hydraulic excavator referred to as an example of a construction machine.

The wheeled excavator shown in FIG. 4 is provided with a travel base 1, a upperstructure 2 mounted on the travel base 1, and working equipment 3 attached tiltably in an up-and-down direction to the upperstructure 2. A body is constituted by the travel base 1 and upperstructure 2. The working equipment 3 includes a boom 4 attached to the upperstructure 2, an arm 5 connected to a free end of the boom 4, and a bucket 6 attached to a free end of the arm 5. The working equipment 3 also includes boom cylinders 4a for driving the boom 4, an arm cylinder 5a for driving the arm 5, and a bucket cylinder 6a for driving the bucket 6. The upperstructure 2 is provided on a revolving frame 2a thereof with a cab 7 in which a seat is disposed, and is provided at a rear position thereof with a counterweight 8 that ensures weight balance.

The above-mentioned working equipment 3 is arranged laterally to, specifically on a right side of the cab 7. On a right side of the boom 4 and the boom cylinders 4a, steps 11 are arranged including plural step members that allow an operator to ascend to or descend from the upperstructure 2 by stepping on them. Further, a compartment cover 9 is arranged on a right side of the steps 11. Although not shown in FIG. 4, control valves that control actuators, for example, the boom cylinders 4a, the arm cylinder 5a and the like are disposed in an accommodation space formed, for example, by the steps 11 and compartment cover 9. As a conventional technology of this sort, there is one disclosed in Patent Document 1.

PRIOR ART DOCUMENT

Patent Document

Patent Document 1: JP-A-2010-106450

DISCLOSURE OF THE INVENTION

Problem to be Solved by the Invention

On the above-mentioned wheeled excavator shown in FIG. 4 or a crawler hydraulic excavator described in Patent Document 1, the compartment cover 9 tends to block vision when an operator sitting in the seat sees the right side. Over years, there has hence been a desire for the development of a technology that can realize the assurance of good vision for an operator.

With the actual situation of the above-mentioned conventional technology in view, the present invention has as an object thereof the provision of a construction machine that can realize the assurance of good vision for an operator sitting in a seat.

Means for Solving the Problem

To achieve this object, the present invention is characterized in that, in a construction machine provided with a body, working equipment attached to the body, a seat disposed on the body, steps arranged laterally to the seat and comprising plural step members, and a compartment cover arranged on a side opposite to the seat with respect to the steps, an indentation is formed in the compartment cover at a part thereof that faces a space defined between the plural step members.

According to the present invention configured as described above, an operator sitting in the seat can see out of the compartment cover through the space, which is defined between the step members, and the indentation in the compartment cover, said indentation corresponding to the space. The present invention can, therefore, realize the assurance of good vision for the operator sitting in the seat.

The present invention is characterized in that in the above-described invention, the indentation has been formed upon press working to fabricate the compartment cover, and comprises an arcuate indentation as seen in a side view. According to the present invention configured as described above, the indentation is also formed upon press working to fabricate the compartment cover, thereby making it possible to decrease the man-hour needed for the formation of the indentation.

The present invention is characterized in that in the above-described invention, the steps further comprise plates on which the plural step members are secured, the plural step members comprise an upper step member arranged at an upper position, and a lower step member arranged at a position immediately below the upper step member, and the indentation is located at an upper extremity thereof in a neighborhood of a lower surface of the upper step member and at an lower extremity thereof in a neighborhood of an upper surface of the lower step member, and as seen in a side view, is formed such that a most indented portion thereof is as proximate as possible to the associated one of the plates. The present invention configured as described above can assure, by the indentation, the formation of a large open space in the compartment cover, and therefore, can realize the assurance of better vision for the operator sitting in the seat.

The present invention is characterized in that in the above-described invention, a plurality of indentations as defined above are formed along a direction to arrangement of the steps. The present invention configured as described above can assure, for the operator sitting in the seat, a wide range of vision along the direction to arrangement of the steps, and therefore, can realize the assurance of still better vision for the operator sitting in the seat.

The present invention is characterized in that in the above-described invention, the construction machine has a cab, in which the seat is disposed, on a left side of the body, the working equipment on a right side of the cab, the steps on a right side of the working equipment, and the compartment cover on a right side of the steps, all as viewed toward a front of the body, and control valves that control flows of hydraulic oil to actuators are disposed in an accommodation space formed by the steps and the compartment cover. The present invention configured as described above can realize the assurance of good, right side vision for the operator sitting in the seat inside the cab.

Advantageous Effects of the Invention

The present invention can realize the conventionally-desired assurance of good vision for an operator sitting in a seat, and can provide a construction machine with work performance and work safety improved over those of conventional construction machines.

MODES FOR CARRYING OUT THE INVENTION

An embodiment of the construction machine according to the present invention will hereinafter be described based on the drawings.

Figure 1:
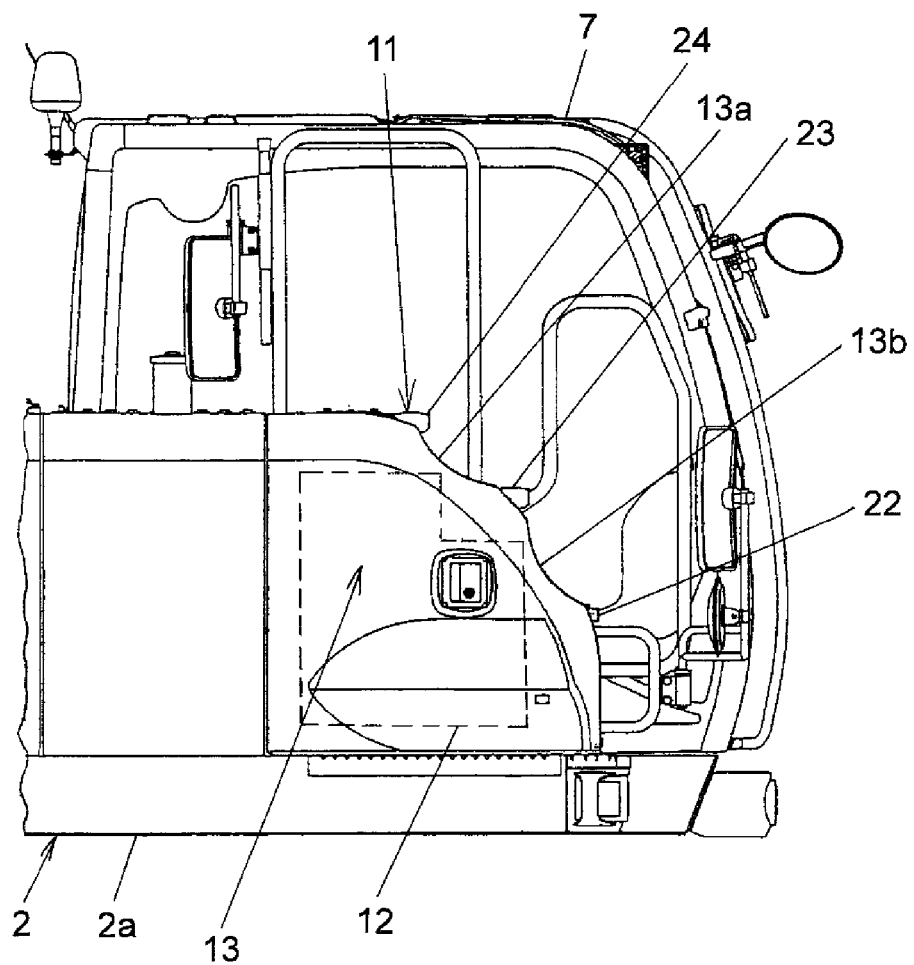
FIG. 1 is a fragmentary side view showing an embodiment of the present invention.
Figure 2:
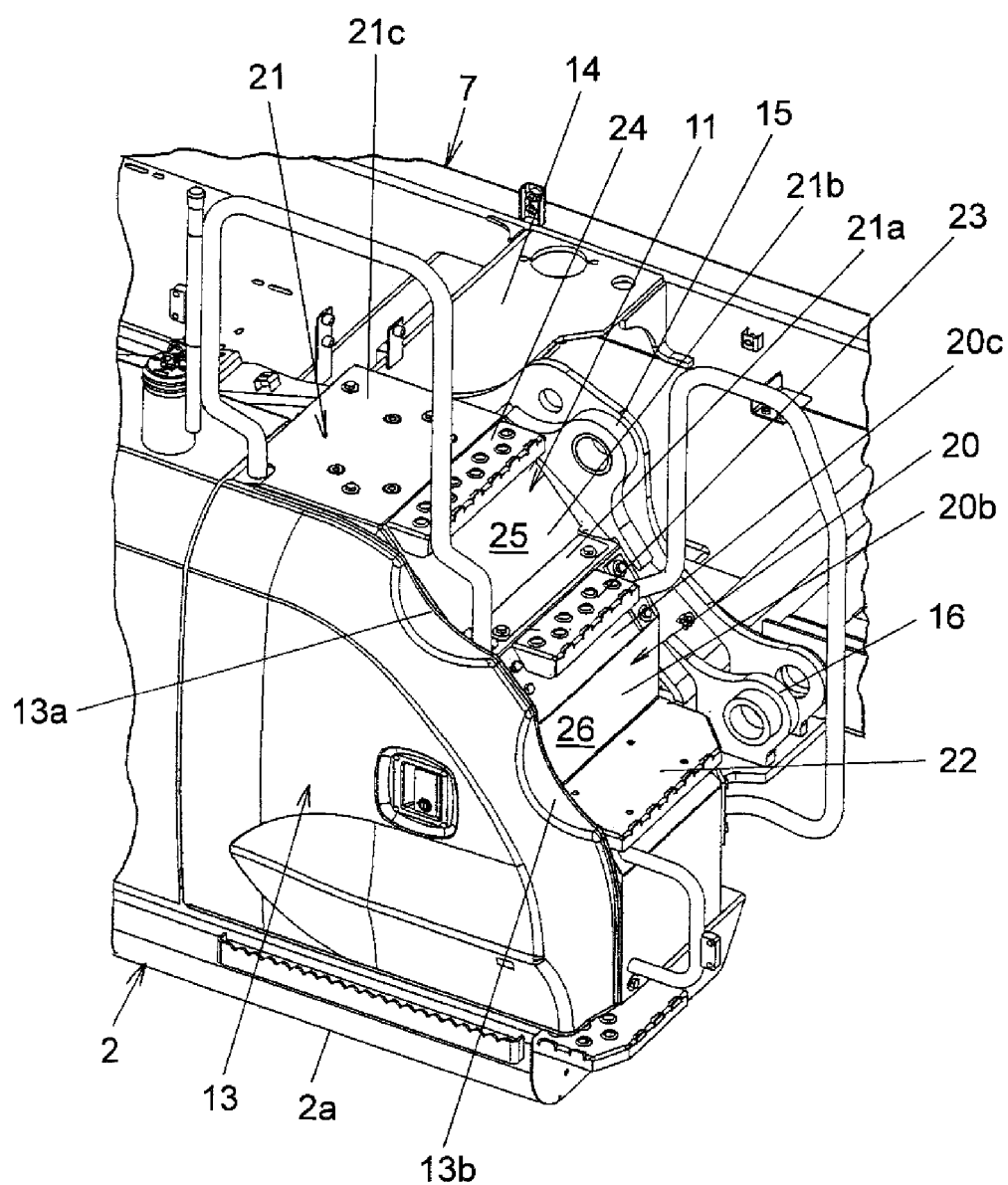
FIG. 2 is a fragmentary perspective view depicting this embodiment.
Figure 3:
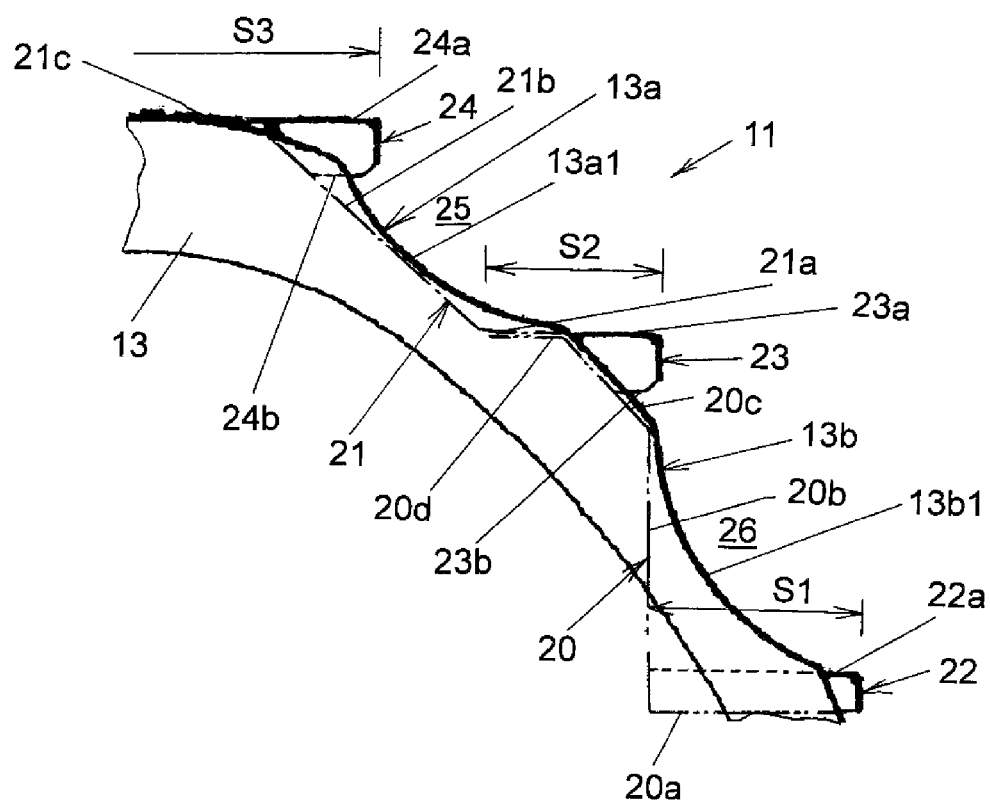
FIG. 3 is an enlarged side view illustrating a relationship in layout between steps and indentations formed in a compartment cover, with all of which this embodiment is provided.

FIG. 1 is a fragmentary side view showing the embodiment of the present invention, FIG. 2 is a fragmentary perspective view depicting this embodiment, and FIG. 3 is an enlarged side view illustrating a relationship in layout between steps and indentations formed in a compartment cover, with all of which this embodiment is provided.

The construction machine according to this embodiment is, for example, a wheeled excavator as a hydraulic excavator. The fundamental configuration of the wheeled excavator according to this embodiment is similar, for example, to the one mentioned above and shown in FIG. 4. It is the matter associated with the compartment cover that this embodiment is different from the one shown in FIG. 4. Therefore, a description will hereinafter be made by also using, as needed, the signs and terms employed in connection with the above-mentioned wheeled excavator shown in FIG. 4.

Figure 4:
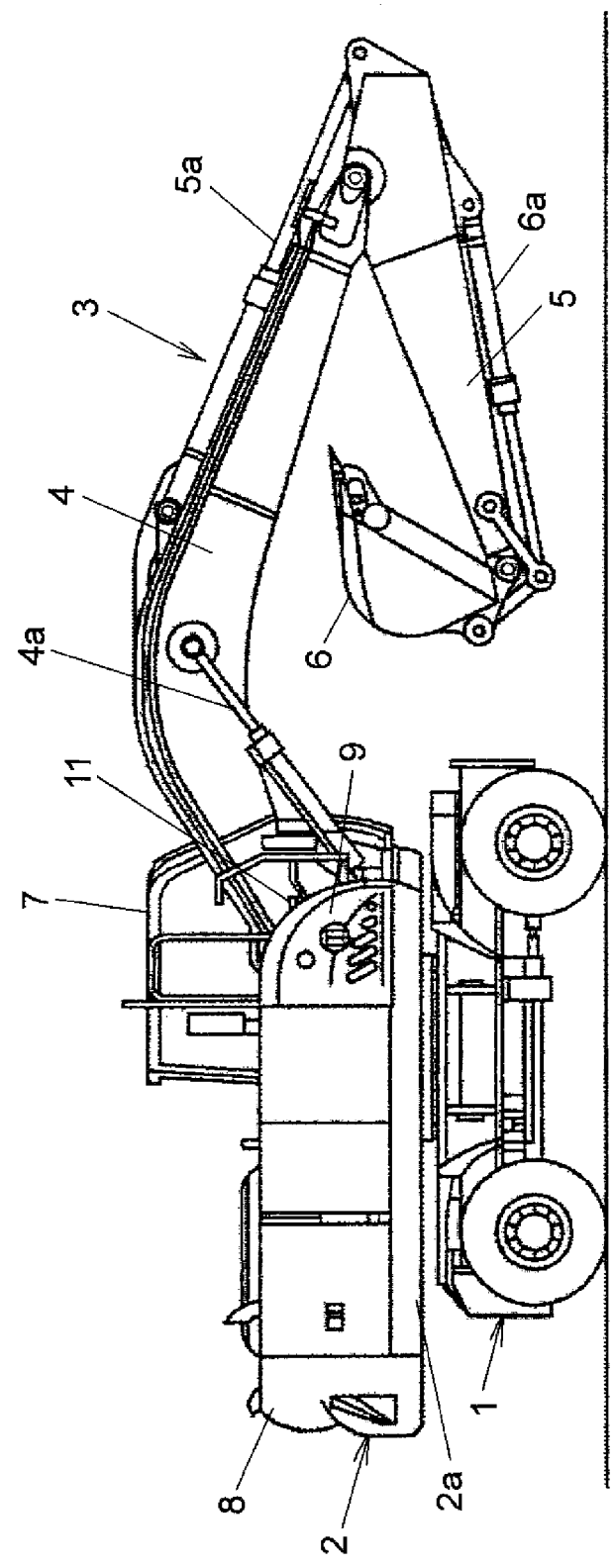
FIG. 4 is a side view showing a wheeled excavator as a hydraulic excavator referred to as an example of a construction machine.

As described with reference to FIG. 4, the wheeled excavator according to this embodiment is provided with the travel base 1 and upperstructure 2 that constitute a body, and on the revolving frame 2, is also provided with the cab 7. On a right side of the cab 7, the working equipment 3 is arranged including the boom, the arm 5, and the like. It is to be noted that in FIG. 2, the wheeled excavator is depicted with the working equipment 3 detached therefrom. The boom 4 is connected to a bracket 15 such that it is pivotable in an up-and-down direction, and the boom cylinders 4a are connected to brackets 16 such that they are pivotable in an up-and-down direction. Further, the steps 11 are arranged on a right side of the working equipment 3 attached to the upperstructure 2 via the brackets 15,16, and the compartment cover 13 is arranged on a right side of the steps 11. Although omitted from illustration in FIG. 2, the seat is disposed on a base 14 arranged in the cab 7.

The steps 11 include plural step members, and plates on which these plural step members are secured. Described specifically, as shown in FIGS. 2 and 3, the step members 11 are provided, for example, with a first plate 20 arranged on a lower side and a second plate 21 fixed on the first plate 20 by bolts, and also with a first step member 22, second step member 23 and third step member 24.

As illustrated in FIG. 3, the first plate 20 has a lower flat plate part 20a fixed on a member arranged on the revolving frame 2a, a vertical riser part 20b formed by bending from the lower flat plate part 20a, an inclined riser part 20c formed by bending from the vertical riser part 20b, and an upper flat plate part 20d formed by bending from the inclined riser part 20c.

The second plate 21 has, for example, a lower flat plate part 21a placed on the upper flat plate part 20d of the first plate 20 and fixed on the upper flat plate part 20d by bolts, an inclined riser part 21b formed by bending from the lower flat plate part 21a, and an upper flat plate part 21c formed by bending from the inclined riser part 21b and fixed on a member arranged on the revolving frame 2a.

The first step member 22 is fixed on the lower flat plate pate 20a of the first plate 20. The second step member 23 is fixed by welding on the inclined riser part 20c of the first plate 20 such that its upper wall 23a lies in flush with the lower flat plate part 21a of the second plate 21. The third step member 24 is fixed by welding on the inclined riser part 21b of the second plate 21 such that its upper wall 24a lies in flush with the upper flat plate part 21c of the second plate 21.

The tread depth S1 of the first step member 22, the tread depth S2 including the upper wall 23a of the second step member 23 and the lower flat plate part 21a of the second plate 21, and the tread depth S3 including the upper wall 24a of the third step member 24 and the upper flat plate part 21c of the second plate 21, all of which are illustrated in FIG. 3, are set at predetermined standard dimensions or greater, respectively. Owing to the arrangement of the first plate 20, second plate 21, first step member 22, second step member 23 and third step member 24 as described above, a space 25 is defined between the second step member 23 and the thirds step member 24, and in addition, a space 26 is defined between the first step member 22 and the second step member 23.

It is to be noted that as shown in FIG. 1, control valves 12 and the like, which control actuators such as the boom cylinders 4a and arm cylinder 5a, are disposed in an accommodation space formed by the steps 11 and the compartment cover 13.

In this embodiment, plural indentations are formed, for example, along the direction to arrangement of the steps 11 in the compartment cover 13 at parts thereof that face the spaces 25,26, respectively. Described specifically, as shown in FIGS. 2 and 3, an upper indentation 13a is formed in an edge part of the compartment cover 13 such that it faces the space 25, and a lower indentation 13b is formed in the edge part of the compartment cover 13 such that it faces the space 26.

These upper indentation 13a and lower indentation 13b are formed upon pressing work to fabricate the compartment cover 13, and as illustrated in FIG. 3, comprise arcuate indentations, respectively, as seen in a side view.

As also illustrated in FIG. 3, the upper indentation 13a is formed such that its upper extremity is located in a neighborhood of a lower surface 24b of the third step member 24 forming an upper step member arranged at an upper position relative to the second step member 23, its lower extremity is located in a neighborhood of an upper surface 23a of the second step member 23 forming a lower step member arranged at a position immediately below the third step member 24, and as seen in the side view illustrated in FIG. 3, a most indented portion 13a1 of the upper indentation 13a is as proximate as possible to the inclined riser part 21b of the second plate 21 from the manufacturing standpoint. Here, it is to be noted that the above-mentioned in a neighborhood of a lower surface 24b" of the third step member 24 includes a lower surface 24b and its adjacent portion or portions. It is also to be noted that the above-mentioned "in a neighborhood of an upper surface 23a" of the second step member 23 includes an upper wall 23a and its adjacent portion or portions.

Similarly, the lower indentation 13a is also formed such that its upper extremity is located in a neighborhood of a lower surface 23b of the second step member 23 forming an upper step member arranged at an upper position relative to the first step member 22, its lower extremity is located in a neighborhood of an upper surface 22a of the first step member 22 forming a lower step member arranged at a position immediately below the second step member 23, and as seen in the side view illustrated in FIG. 3, a most indented portion 13b1 of the lower indentation 13b is as proximate as possible to the vertical riser part 20b of the first plate 20 from the manufacturing standpoint. Here, it is also to be noted that the above-mentioned "in a neighborhood of lower surface 23b" of the second step member 23 includes a lower surface 23b and its adjacent portion or portions. It is also to be noted that the above-mentioned "in a neighborhood of upper surface 22a" of the first step member 22 includes an upper wall 22a and its adjacent portion or portions.

This embodiment configured as described above allows an operator, who is sitting in the unillustrated seat disposed on the base 14 inside the cab 7 depicted in FIG. 2, to see the side right of the compartment cover 13 through the space 25 defined between the second step member 23 and the third step member 24 and the upper indentation 13a formed in the compartment cover 13 in correspondence to the space 25, and also through the space 26 defined between the first step member 22 and the second step member 23 and the lower indentation 13b formed in the compartment cover 13 in correspondence to the space 26. This embodiment, therefore, can realize the assurance of good right side vision for the operator sitting in the seat. As a consequence, this embodiment can provide the wheeled excavator with improved work performance and work safety.

As the upper indentation 13a and lower indentation 13b are also formed upon press working of the compartment cover 13, this embodiment can decrease the man-hour needed for the formation of the upper indentation 13a and lower indentation 13b, thereby making it possible to reduce an increase in manufacturing cost.

This embodiment is provided with the upper indentation 13a formed to extend along the space 26 as much as possible from the manufacturing standpoint and the lower indentation 13b formed to extend along the space 26 as much as possible from the manufacturing standpoint. Therefore, this embodiment can assure, by the indentations, the formation of large open spaces in the compartment cover 13, and can realize the assurance of still better vision for the operator sitting in the seat.

In this embodiment, the plural indentations, that is, the upper indentation 13a and lower indentation 13 bare formed in the compartment cover 13. Accordingly, this embodiment can assure, for the operator sitting in the seat, a wide range of vision along the direction to arrangement of the steps 11, and can realize the assurance of still better vision for the operator sitting in the seat.

It is to be noted that the present invention is not limited to wheeled excavators although the construction machine according to the above-described embodiment is configured as a wheeled excavator. The present invention can be applied to crawler hydraulic excavators. The present invention can also be applied even to construction machines different from hydraulic excavators provided that they are each provided with a compartment cover on a side opposite to a seat with respect to steps including plural step members and arranged laterally to the seat.

In a construction machine or the like which does not require to consider the concern about an increase in manufacturing man-hour, the construction machine may be configured to form such indentations as substantially conforming to the steps as seen in a side view in place of such arcuate upper indentation 13a and lower indentation 13b as in this embodiment. When such a configuration is adopted, it is possible to realize, for the operator sitting in the seat, the assurance of still better vision than that available from the above-described embodiment.

LEGEND

2 Upperstructure (body)
3 Working equipment
7 Cab
9 Compartment cover
11 Steps
12 Control valves
13 Compartment cover
13a Upper indentation
13a1 Portion
13b Lower indentation
13b1 Portion
14 Base
20 First plate
20a Lower flat plate part
20b Vertical riser part
20c Inclined riser part
20d Upper flat plate part
21 Second plate
21a Lower flat plate part
21b Inclined riser part
21c Upper flat plate part
22 First step member
22a Upper wall
23 Second step member
23a Upper wall
23b Lower surface
24 Third step member
24a Upper wall
24b Lower surface
25 Space
26 Space

The invention claimed is:

1. A construction machine provided with a body, working equipment attached to the body, a seat disposed on the body, steps arranged laterally to the seat and comprising plural step members, and a compartment cover arranged on a side opposite to the seat with respect to the steps, wherein:
    an indentation is formed in the compartment cover at a part thereof that faces a space defined between the plural step members.

2. The construction machine according to claim 1, wherein:
    the indentation has been formed upon press working to fabricate the compartment cover, and comprises an arcuate indentation as seen in a side view.

3. The construction machine according to claim 2, wherein:
    the steps further comprise plates on which the plural step members are secured,
    the plural step members comprise an upper step member arranged at an upper position, and a lower step member arranged at a position immediately below the upper step member, and
    the indentation is located at an upper extremity thereof in a neighborhood of a lower surface of the upper step member and at an lower extremity thereof in a neighborhood of an upper surface of the lower step member, and as seen in a side view, is formed such that a most indented portion thereof is as proximate as possible to the associated one of the plates.

4. The construction machine according to claim 3, wherein:
    a plurality of indentations as defined in claim 3 are formed along a direction to arrangement of the steps.

5. The construction machine according to claim 1, wherein:
    the construction machine has a cab, in which the seat is disposed, on a left side of the body, the working equipment on a right side of the cab, the steps on a right side of the working equipment, and the compartment cover on a right side of the steps, all as viewed toward a front of the body, and control valves that control flows of hydraulic oil to actuators are disposed in an accommodation space formed by the steps and the compartment cover.

6. The construction machine according to claim 2, wherein:

the construction machine has a cab, in which the seat is disposed, on a left side of the body, the working equipment on a right side of the cab, the steps on a right side of the working equipment, and the compartment cover on a right side of the steps, all as viewed toward a front of the body, and control valves that control flows of hydraulic oil to actuators are disposed in an accommodation space formed by the steps and the compartment cover.

7. The construction machine according to claim 3, wherein:

the construction machine has a cab, in which the seat is disposed, on a left side of the body, the working equipment on a right side of the cab, the steps on a right side of the working equipment, and the compartment cover on a right side of the steps, all as viewed toward a front of the body, and control valves that control flows of hydraulic oil to actuators are disposed in an accommodation space formed by the steps and the compartment cover.

8. The construction machine according to claim 4, wherein:

the construction machine has a cab, in which the seat is disposed, on a left side of the body, the working equipment on a right side of the cab, the steps on a right side of the working equipment, and the compartment cover on a right side of the steps, all as viewed toward a front of the body, and control valves that control flows of hydraulic oil to actuators are disposed in an accommodation space formed by the steps and the compartment cover.

\* \* \* \* \*